Jan. 5, 1937.     F. W. WILLIAMS     2,066,814
FASTENING DEVICE
Filed Feb. 26, 1936

Inventor
Frederick W. Williams
By Ritter, Machlin & O'Neill
his Attorneys

Patented Jan. 5, 1937

2,066,814

UNITED STATES PATENT OFFICE 2,066,814

FASTENING DEVICE

Frederick W. Williams, Honolulu, Territory of Hawaii

Application February 26, 1936, Serial No. 65,930

8 Claims. (Cl. 72—118)

My invention relates to fastening devices for fibrous and cork wall boards and the like and it has for its principal object to provide an improved blind fastener for securing wall boards to suitable supports, such, for example, as joists, studs and wooden furring.

The principal feature of the invention consists in providing the fastener with a prong which is adapted to be inserted in the wall board and with a plate portion which, after the prong has been inserted in the board, is adapted to be bent inwardly toward the inner face of the board to cause a spur with which it is formed to penetrate the board at an angle to the prong.

Another feature of the invention consists in providing the fastener with a bendable portion for connecting a nail or the like to the fastener, the nail serving to secure the board in which the fastener is inserted to a suitable support.

Other and more specific features of the invention, residing in advantageous forms, combinations and relations of parts, will hereinafter appear and be pointed out in the claims.

In the drawing, illustrating a preferred embodiment of the invention,

Figure 4:
Figure 4 is a plan view of a blank from which the fastener may be conveniently formed.

Referring more particularly to the drawing, the fastener, indicated generally by the reference numeral 1, is preferably formed from a single blank of sheet metal of the form illustrated in Figure 4. The thickness or gauge of the blank is such that the completely formed fastener will be comparatively rigid and yet will possess sufficient flexibility to enable portions thereof to be bent upon the application of a suitable force, such, for example, as may be easily delivered by a blow with a carpenter's hammer.

The fastener is formed with a plate portion 2 which is adapted to be disposed in overlapping relation to the inner face of a wall board. Extending inwardly from one end of the plate portion is a prong 3 which is adapted to be inserted in the wall board at an angle to its inner face and which, in order that the prong may not be withdrawn from the board by a straight pull, is preferably curved.

Extending inwardly from the opposite end of the plate portion 2 is a spur 4 which is adapted to penetrate the wall board at an angle to the prong so as to firmly lock the fastener to the board. The spur is preferably formed by being struck-up from an offset portion 5 of the plate portion 2 which is adapted to be bent into overlapping relation with the outer face of the plate portion to secure to the fastener a nail 6 or the like disposed within the opening 7 formed in the offset portion by a spur.

Figure 3:
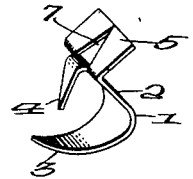
Figure 3 is a perspective view of the fastener illustrating its shape before portions thereof are bent to respectively connect a nail to the fastener and to firmly secure the fastener to a wall board.
Figure 5:
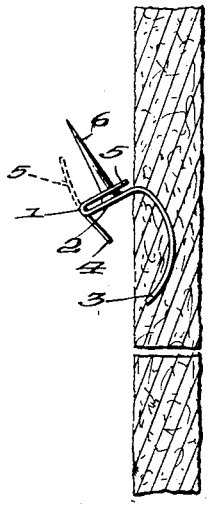
Figure 5 is a sectional view of a fragment of a wall board showing the fastener in elevation as it appears after being partly attached to the wall board and a portion thereof has been bent to connect a nail thereto.
Figure 6:
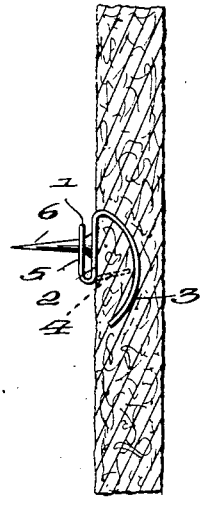
Figure 6 is a sectional view of a fragment of a wall board showing the fastener completely attached to the board and ready to secure the latter to a suitable support.

The fastener is originally formed so that the plate portion 2 thereof is so disposed with respect to the prong 3 that, after the prong has been inserted in the wall board, the plate portion will, as shown in Figure 5, be disposed at an acute angle to the inner face of the board. It is also originally formed so that the offset portion 5 projects outwardly from the plate portion 2 at a rather substantial angle, such as shown in Figure 3 and in dotted lines in Figure 5. By arranging the plate portion 2 with the offset portion 5 in this manner, it will be evident that the prong of the fastener may be inserted in the board without interference from the spur 4 and that a nail or similar attaching device may be easily inserted through the opening 7 from the rear of the offset portion 5, so that the head of the nail will be disposed between the latter and the plate portion 2.

To permit the prong of the fastener to initially penetrate the board without danger of deforming the prong, the board is preferably first pierced for a short distance with a knife or other suitable instrument at an angle of approximately 45°. The prong may then be easily inserted in the indenture formed by the knife and then pressed inwardly until it is fully embedded within the board. The nail is then inserted in the opening 7, after which the offset portion 5 is bent inwardly until the head of the nail is firmly clamped between the offset portion and the plate portion 5. The plate portion, together with the offset portion, is then forced inwardly in any convenient manner until it overlappingly engages the inner face of the board. During bending of the plate portion inwardly, the spur 4 penetrates the board and the fastener is thus securely attached to the board with the nail connected thereto in proper position to be driven into the support to which the board is to be attached. After the desired number of fastening devices have been secured to the board, the latter is then properly positioned and the nails driven into the previously provided support for the board in any suitable manner, such, for example, by placing a wooden strip on the outer face of the board and hammering thereon.

Instead of securing the nail to the fastener after the prong thereof has been inserted in the board, it will be appreciated that the nail may just as easily be connected to the fastener before the prong is embedded in the board.

Figure 1:
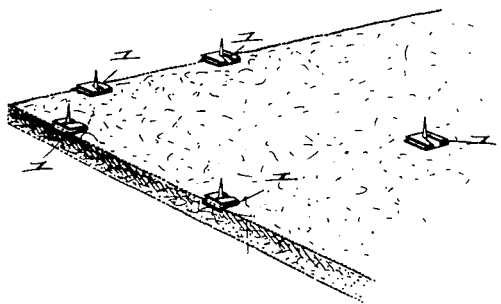
Figure 1 is a perspective view showing a portion of a wall board and a plurality of the fastening devices completely secured thereto, each of the devices being provided with a nail.
Figure 2:
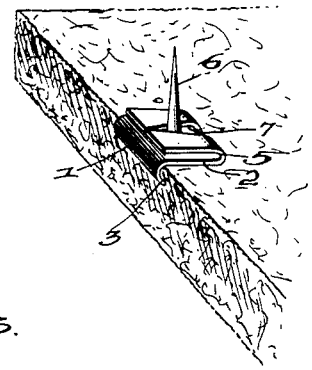
Figure 2 is an enlarged perspective view of a portion of a wall board showing a fastener which has been connected thereto by first having its prong inserted in one edge thereof.
Figure 7:
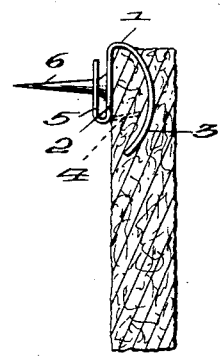
Figure 7 is a view similar to Figure 6 showing the fastener disposed at an edge of the wall board.

From the foregoing, it will be appreciated that a fastener is provided whereby all makes of fibrous and cork wall boards may be quickly and easily attached to suitable supports without exposed nailing and that the fastener is of such construction that, after having been once connected to the board, it will be impossible for it to work loose therefrom. Furthermore, the construction of the fastener is such that, as clearly shown in Figures 2 and 7, it may be attached to the marginal edges of the board without damage thereto.

What I claim is:

1. A blind fastener for attaching wall boards and the like to a support, said fastener having a portion for receiving means to secure it to the support and including a prong adapted to be inserted in the board at an angle to the inner face thereof, and a plate portion having an angularly projecting spur adapted to penetrate the inner face of the board, said plate portion being adapted to be bent inwardly toward said face after the prong has been inserted in the board to cause the spur to penetrate the board.

2. A blind fastener for attaching wall boards and the like to a support including a prong adapted to be inserted in the board, a plate portion having a spur adapted to penetrate the inner face of the board at an angle to said prong, said plate portion being adapted to be bent inwardly into substantial parallelism with said face after the prong has been inserted in the board to cause the spur to penetrate the board, and means for receiving fastening means to secure the fastener to said support.

3. A blind fastener for attaching wall boards and the like to a support, said fastener including a prong adapted to be inserted in the board, and a plate portion adapted to be disposed in overlapping relation with the inner face of the board, said plate portion being provided with a spur adapted to penetrate the inner face of the board at an angle to the prong and with a portion provided with an opening for receiving means to secure the fastener to said support, said plate portion being adapted to be bent inwardly toward said face after the prong has been inserted in the board to cause the spur to penetrate the board.

4. A blind fastener for attaching wall boards and the like to a support, said fastener including a prong adapted to be inserted in the board at an acute angle to the inner face thereof, a plate portion adapted to overlappingly engage said face of the board, and bendable means for connecting a nail or the like to the fastener with its head in abutting relation to the outer face of said plate portion.

5. A blind fastener for attaching wall boards and the like to a support, said fastener including a prong adapted to be inserted in the board, and a plate-like member adapted to overlappingly engage the inner face of the board, said member having a rearwardly projecting spur adapted to penetrate said face and also having a bendable portion for connecting a nail or the like to the fastener.

6. A blind fastener for attaching wall boards and the like to a support, said fastener including a prong adapted to be inserted in the board, and a plate-like member adapted to be disposed in overlapping relation to the inner face of said board, said member having an offset portion provided with a struck-up spur adapted to penetrate said face, said spur providing the offset portion with an opening for receiving a nail or the like for securing the fastener to the support.

7. A blind fastener for attaching wall boards and the like to a support, said device including a curved prong adapted to be inserted in the board at an angle to the inner face thereof, and a plate-like member adapted to overlap said inner face, said plate-like member having an offset portion provided with a struck-up spur adapted to penetrate said face and said spur providing the offset portion with an opening for receiving a nail or the like for securing the fastener to the support, said offset portion being bendable toward said member to connect the nail to the fastener.

8. A blind fastener for attaching wall boards and the like to a support, said fastener including a prong adapted to be inserted in the board at an angle to the inner face thereof, a plate portion adapted to overlappingly engage the inner face of the board and having a rearwardly projecting spur adapted to penetrate said face at an angle to the prong, and means projecting outwardly from said plate portion for securing the fastener to a support.

FREDERICK W. WILLIAMS.